US006377345B1

(12) United States Patent
Powell

(10) Patent No.: US 6,377,345 B1
(45) Date of Patent: Apr. 23, 2002

(54) HIGH SENSITIVITY PARTICLE DETECTION

(75) Inventor: Brian Powell, Maidenhead (GB)

(73) Assignee: Kidde Fire Protection Limited, Derby (GB)

( * ) Notice: Subject to any disclaimer, the term of this patent is extended or adjusted under 35 U.S.C. 154(b) by 0 days.

(21) Appl. No.: 09/446,968

(22) PCT Filed: Oct. 13, 1998

(86) PCT No.: PCT/GB98/03079

§ 371 Date: Jan. 27, 2000

§ 102(e) Date: Jan. 27, 2000

(87) PCT Pub. No.: WO99/19852

PCT Pub. Date: Apr. 22, 1999

(30) Foreign Application Priority Data

Oct. 15, 1997 (GB) ............................................ 9721861

(51) Int. Cl.[7] ............................................... G01N 15/02

(52) U.S. Cl. ....................... 356/336; 356/337; 356/341; 356/340; 250/574

(58) Field of Search ................................ 356/336, 337, 356/338, 339, 340, 341, 342, 343; 250/574, 575, 576

(56) References Cited

U.S. PATENT DOCUMENTS 4,221,485 A 9/1980 Schulze ...................... 356/338
4,547,675 A 10/1985 Muggli et al. .............. 250/565
5,416,580 A * 5/1995 Trainer ....................... 356/336
6,011,478 A 1/2000 Suzuki et al. ............... 340/630

FOREIGN PATENT DOCUMENTS

| | | | |
|---|---|---|---|
| EP | 0 877 345 | 11/1998 | ......... G08B/17/103 |
| GB | 1 434 787 | 12/1973 | .......... G01N/21/26 |
| GB | 1 533 192 | 4/1977 | .......... G01N/21/26 |
| GB | 1 561 421 | 4/1977 | ........... G08B/17/10 |
| GB | 2 032 617 | 5/1980 | .......... G01N/21/53 |
| GB | 2 319 605 | 5/1998 | ......... G08B/17/103 |
| WO | WO 89/09392 | 10/1989 | .......... G01N/21/53 |

OTHER PUBLICATIONS

Goodman, "Method for Localizing Light–Scattered Particles, " *IBM Technical Disclosure Bulletin*, vol. 27, No. 5, p. 3164 (19894).

* cited by examiner

*Primary Examiner*—Frank G. Font
*Assistant Examiner*—Sang H. Nguyen
(74) *Attorney, Agent, or Firm*—Leydig, Voit & Mayer, Ltd.

(57) ABSTRACT

A smoke detector is disclosed in which smoke particles are detected by the collection and detection of blue light and infra-red radiation which are emitted into a predetermined path through a scattering volume where the particles may be present. The scattered blue light and the scattered infra-red radiation are collected by an ellipsoidal mirror and focussed onto a suitable detector and then compared to produce an output which indicates either that the detected particles are smoke particles or that they are not smoke particles. The radiation collected by the mirror has been scattered through angles substantially less than 45° and preferably between about 10° and 35°.

14 Claims, 7 Drawing Sheets

HIGH SENSITIVITY PARTICLE DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a particle detector for detecting particles of sizes of less than one micron, comprising radiation emitting means for emitting radiation at two different wavelengths along a predetermined path through a scattering volume, the radiation at one of the wavelengths lying between about 400 nm and about 500 nm, and radiation detection means for receiving and detecting the radiation scattered from the scattering volume by the presence of particles at a predetermined forward scattering angle of less than 45° to the predetermined path of radiation.

2. Description of the Related Art including Information Disclosed under 37C.F.R. 1.97 and 1.98.

The invention also relates to a particle detecting method for detecting particles of sizes of less than one micron, comprising the steps of emitting radiation at two different wavelengths along a predetermined path through a scattering volume, one wavelength lying between about 400 nm and 500 nm, and receiving and detecting the radiation scattered from the scattering volume by the presence of particles at a predetermined forward scattering angle of less than 45° to the predetermined path of radiation.

Such a detector and such a method are shown, for example, in GOODMAN D. S.: "METHOD FOR LOCALISING LIGHT-SCATTERED PARTICLES"; IBM TECHNICAL DISCLOSURE BULLETING vol. 27, no. 5, October 1984, page 3164 XP 002066860, and in WO-A-89 09392. Reference is also made to U.S. Pat. No. 6,011,478 (Suzuki et al).

BRIEF SUMMARY OF THE INVENTION

The invention aims to improve the sensitivity of such a detector and such a method so that the detector and the method are better able to discriminate against particles of a type which are not intended to be detected.

According to the invention, therefore, the detector as first set forth above is characterised in that the radiation of the other wavelength is infra-red radiation, and by output means for comparing outputs from the detecting means respectively corresponding to the received and detected radiation between about 400 nm and 500 nm and the received and detected infra-red radiation whereby to produce a warning signal when the comparison indicates that the particles are of a predetermined type but not when the comparison indicates otherwise. Similarly, according to the invention the method as first set forth above is characterised in that the other wavelength is a wavelength of infra-red radiation, and by the step of comparing two outputs respectively corresponding to the received and detected radiation between about 400 nm and about 500 nm and the received and detected infra-red radiation whereby to produce a warning signal when the comparison indicates that the particles are of a predetermined type but not when the comparison indicates otherwise.

BRIEF DESCRIPTION OF THE SEVERAL VIEWS OF THE DRAWINGS

High sensitivity particle detection apparatus embodying the invention, and methods according to the invention, will now be described, by way of example only, with reference to the accompanying diagrammatic drawings in which.

DETAILED DESCRIPTION OF THE INVENTION

Figure 1:
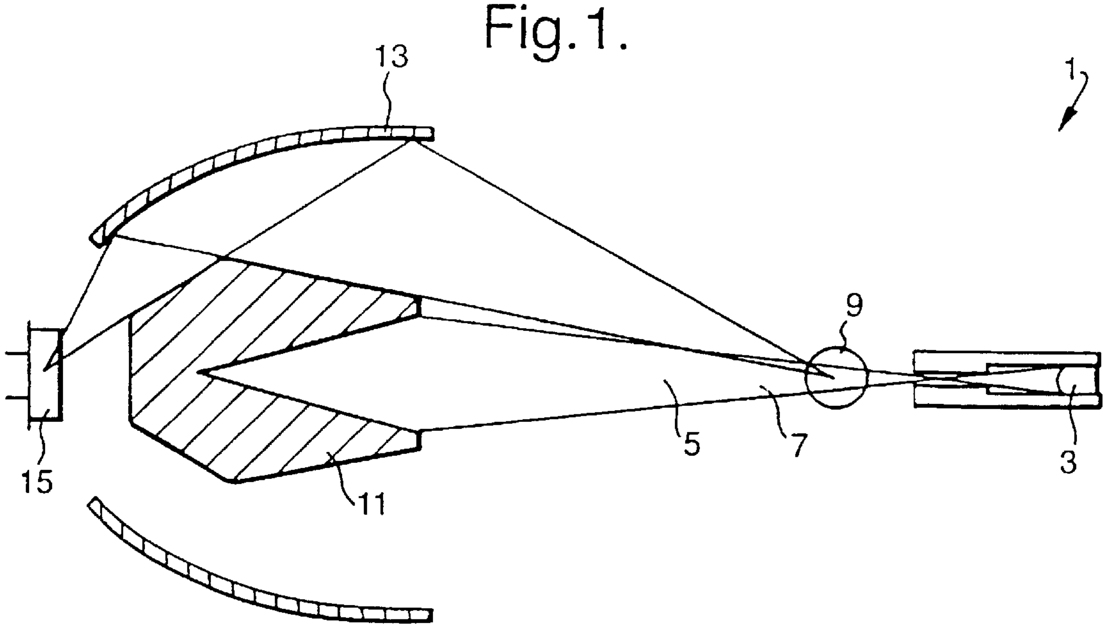
FIG. 1 is a schematic diagram of apparatus for explaining the operation of apparatus embodying the invention which is shown in FIG. 5.

The apparatus and methods to be described are for detecting smoke in air using light scattering techniques, although it will be appreciated that other particles can be detected using the same apparatus and methods. The apparatus and methods aim to detect the presence of smoke particles at smoke densities at least as low as 0.2% per meter. The primary use of such apparatus is for detecting incipient fires.

The apparatus 1 (FIG. 1) comprises a radiation source 3 emitting radiation along a path 5. Radiation 7 passes through a volume 9 towards a beam dump 11. An ellipsoidal mirror 13 is positioned for collecting radiation scattered by the presence of smoke particles in the volume 9 (within a predetermined range of forward scattering angles to be discussed below) and focussing such radiation on a silicon photodiode 15.

It will be appreciated that the collection means for the scattered radiation need not be an ellipsoidal mirror 13 but may be any suitable collection means. Additionally, it will also be appreciated that any suitable detector means may be used and the detector need not be silicon photodiode 15.

In use, radiation 7 from the radiation source 3 is emitted along the path 5 through the scattering volume 9. The presence of any smoke particles in the scattering volume 9 will cause the radiation 7 to be scattered through a predetermined range of angles. The ellipsoidal mirror 13 is positioned such that any light scattered at forward scattering angles of less than 45°, and more particularly at scattering angles between about 10° and 35° will be collected by the ellipsoidal mirror 13. The ellipsoidal mirror 13 focuses the light scattered at these angles from the scattering volume in all planes perpendicular to the incident radiation direction on to the silicon photodiode 15. This arrangement maximises the radiation incident on the photodiode 15. The signal produced by the silicon photodiode 15 may be used to trigger a suitable alarm system and/or a fire extinguishing system.

Any radiation which is not scattered will be incident on and be trapped substantially by the beam dump 11 and no corresponding signal will be produced by the silicon photodiode 15.

The radiation source 3 emits radiation 7 at relatively short wavelengths between about 400 nm and 500 nm, that is, blue visible light; preferably, the radiation source 3 is an LED producing radiation at 470 nm wavelength. It is found that the use of this relatively short wavelength, combined with the use of relatively small forward scattering angles, produces increased sensitivity of particle detection, at least for smoke particles This is explained in more detail with reference to FIGS. 2 to 4.

Figure 2:
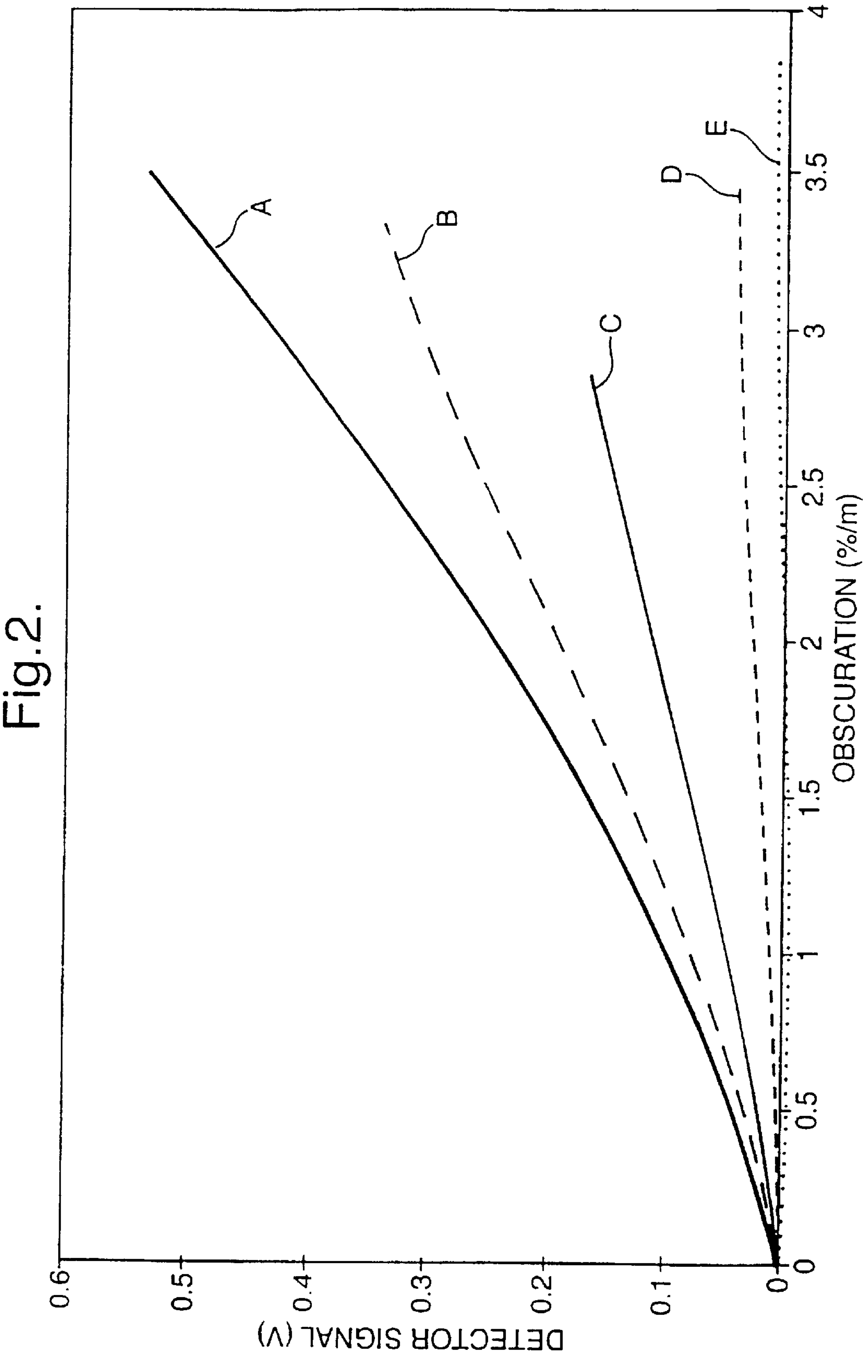
FIGS. 2, 3 and 4 are graphs for explaining the operation of the apparatus shown in FIG. 1.

Curve A in FIG. 2 shows the output of the detector 15 for different degrees of smoke obscuration expressed as a percentage of light obscured per meter. Curves B, C, D and E show the corresponding detector outputs at the same scattering angle but for different (longer) radiation wavelengths. Curve B shows the detector output where the radiation is in the green part of the spectrum. Curve C shows the detector output where the radiation is in the red part of the spectrum. Curve D shows the detector output when the radiation is in the infra-red part of the spectrum and of the order of 880 nm. Finally, curve E shows the detector output when the radiation is in the infra-red part of the spectrum and of the order of 950 nm. In each case, the range of forward scattering angles is the same (between about10° and 35°). The smoke for the tests illustrated was produced by smouldering cotton.

FIG. 2 clearly shows the increased detector output, and thus the increased sensitivity of detection, which is obtained by using a radiation source producing blue visible light of the order of 470 nm. FIG. 2 shows how detectable signals can be produced from the photodiode 15 at smoke densities as low as 0.2% per meter. Radiation at the other wavelengths (curves B, C, D and E) produces significantly lower outputs.

Shorter wavelength light also has the advantage that it has a lower reflectivity from typical matt black surfaces. By suitable design of the detecting apparatus, therefore, the output from the photodiode 15 due to background scattered light signals (primarily signals reflected from internal surfaces of the apparatus and not due to smoke) can be made very small—and significantly less than when light of longer wavelengths is used.

Figure 3:
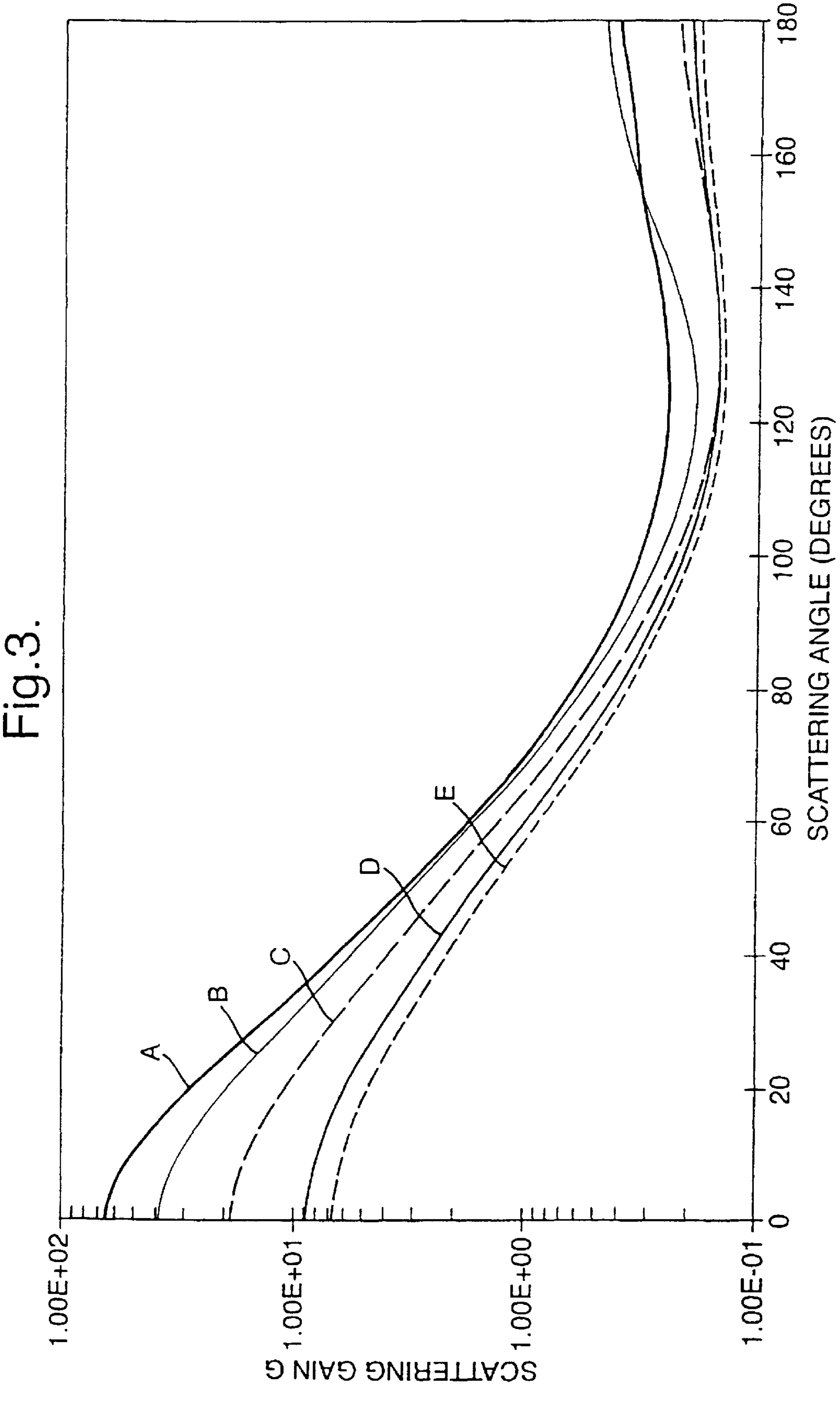

FIG. 3 plots the calculated scattering gain for a particle size distribution typical of smoke against the forward scattering angle using light at different wavelengths. Scattering gain is the amount of light scattered into a unit solid angle as a fraction of the light falling on an individual particle. Curve A corresponds to blue visible light, curve B to green visible light, curve C to red visible light, curve D to infra-red radiation of the order of 880 nm, and curve E to infra-red radiation of 950 nm. FIG. 3 shows how the use of blue visible light (curve A) produce significantly more scattering gain than radiation at the other wavelengths (curves B to E) at scattering angles up to about 155°, although the increase in scattering gain is much more pronounced at scattering angles less than 45°.

Curves A in FIGS. 2 and 3 therefore show how the combination of the use of blue visible light (radiation between 400 and 500 nm) and the use of low scattering angles (between about 10° and 35°) produces a significant increase in sensitivity.

Figure 4:
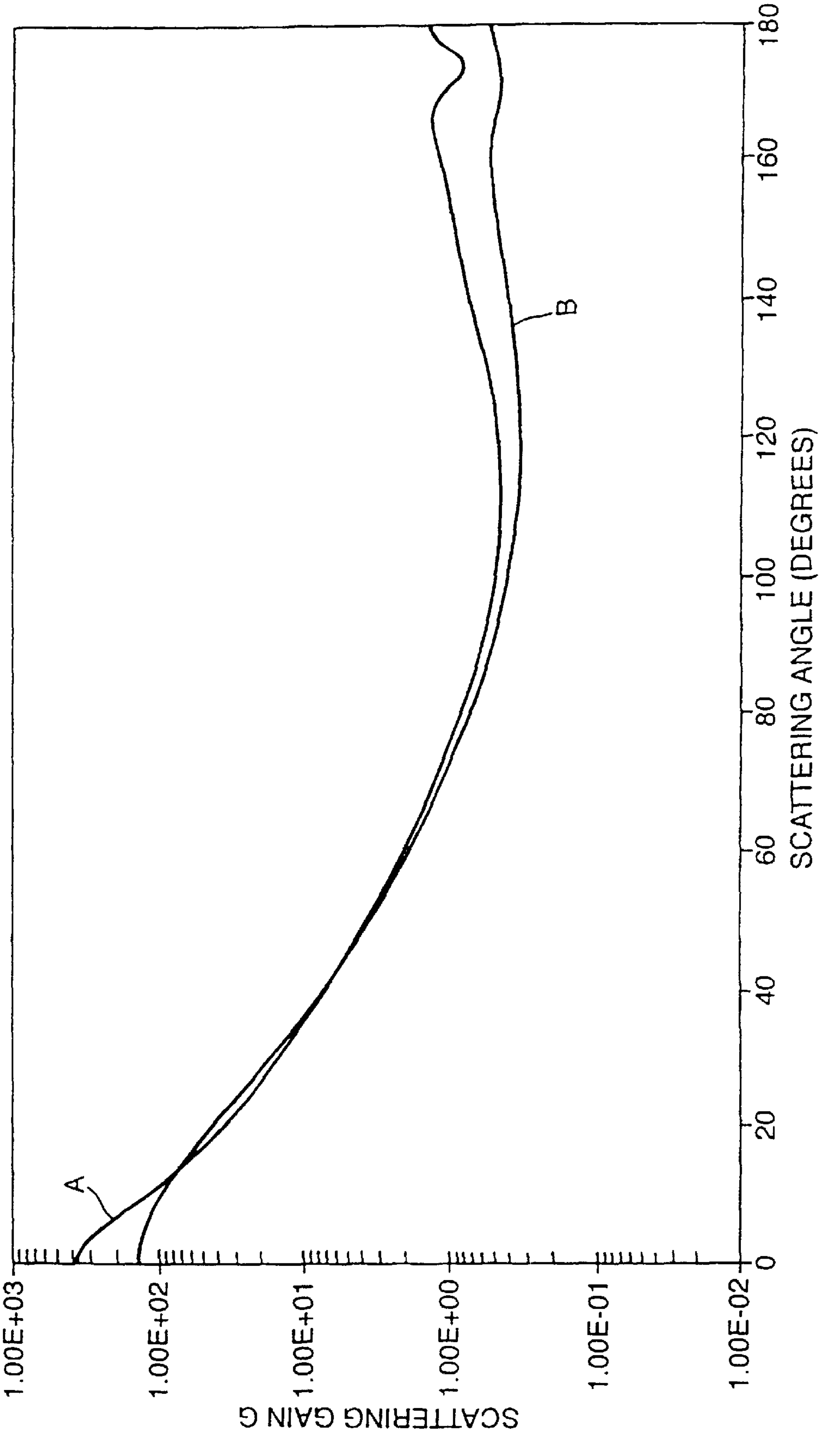

Smoke detectors may be susceptible to false alarms in the presence of larger aerosol particles such as condensed water mist or dust. FIG. 4 corresponds to FIG. 3 except that the particles used are particles having a size distribution typical of condensed water mist, and calculations were carried out for only two wavelengths: blue visible light at 450 nm (curve A), and infra-red radiation at 950 nm (curve E). Curves A and E in FIG. 4 show that the scattering gain is substantially the same at both the wavelengths tested, at least for scattering angles between about 15° and 30°. A comparison of FIGS. 3 and 4 therefore shows that the ratio (signal to noise ratio) between the output of the photodiode in response to smoke particles and the corresponding output for "nuisance" aerosols, such as water mist particles, will be higher when blue light is used than when radiation at the other wavelengths is used.

Figure 5:
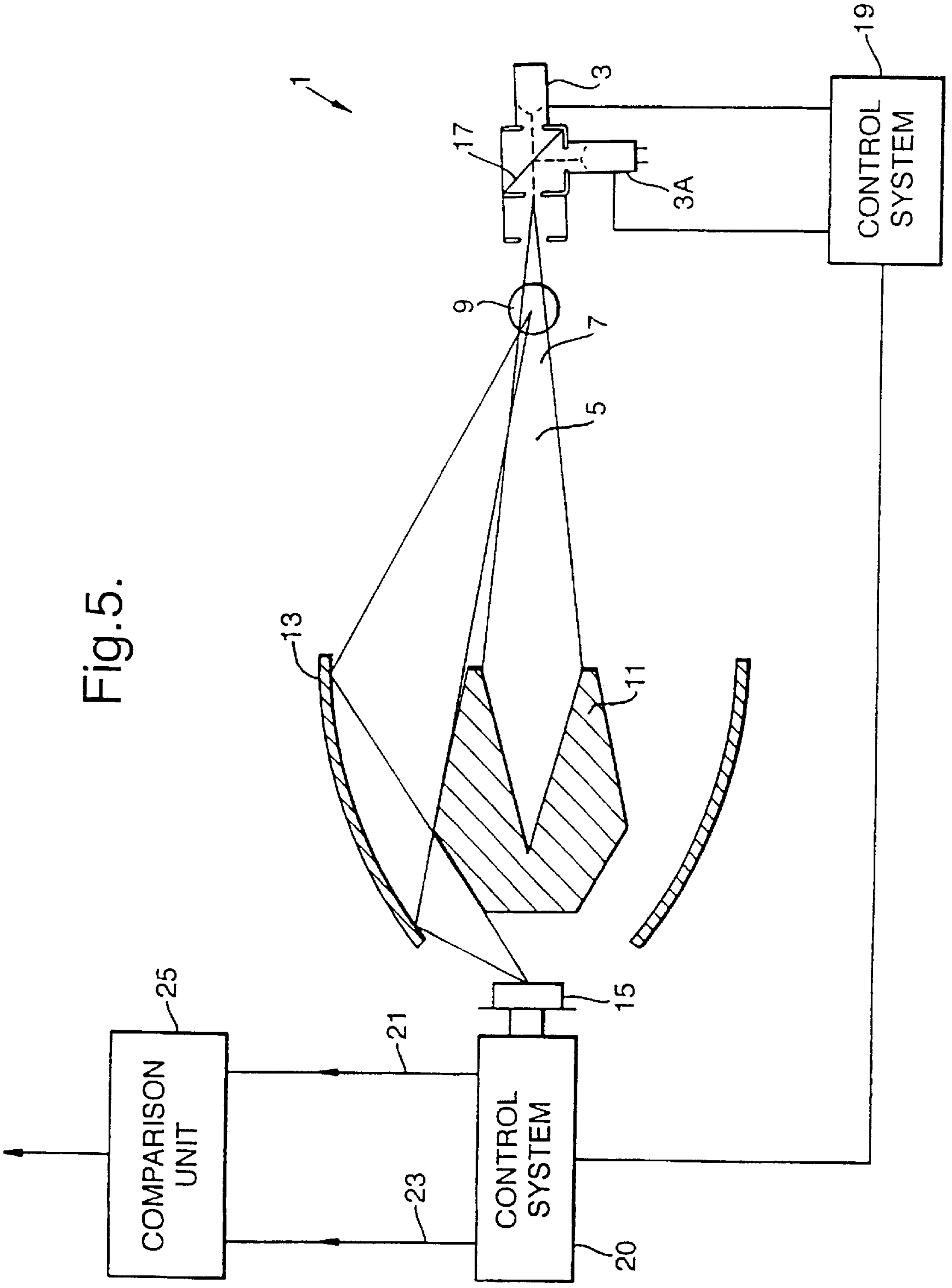
FIG. 5 is a schematic diagram of apparatus embodying the invention.

FIG. 5 shows a modified arrangement of FIG. 1 which uses the principle illustrated by comparing FIGS. 3 and 4. In FIG. 5 items corresponding to items in FIG. 1 are similarly referenced. In FIG. 5, the source 3 of FIG. 1 is supplemented by a source 3A. Source 3 produces blue light, as before, in the range 400 to 500 nm. Source 3A produces infra-red radiation at about 880 nm and may (like source 3) be an LED. The radiation emitted by both sources is passed via a beam splitter 17 and thence through the volume 9.

As before, radiation forward-scattered (at the appropriate angles) by obscuration in the volume 9 is collected by the ellipsoidal mirror 13 and focussed an detector 15. As before, detector 15 is a silicon photodiode. Such a detector is sensitive to blue light and also infra-red radiation at about 880 nm. A control system indicated generally at 19 and 20 enables the detector 15 to produce separate outputs on lines 21 and 23 corresponding respectively to the scattered blue light and the scattered infra-red radiation as received by the detector. The control system 19,20 may take any suitable form. For example, it may arrange to pulse the sources 3 and 3A alternately and to switch the detector output synchronously between the lines 21 and 23. Instead, the sources 3 and 3A can be energised separately at different frequencies and separate narrow band or lock-in amplifiers can be used for responding to the output from the detector and for respectively energising the lines 21 and 23. The outputs of the detector 15 on lines 21 and 23 are processed by a comparison unit 25.

Figure 6:
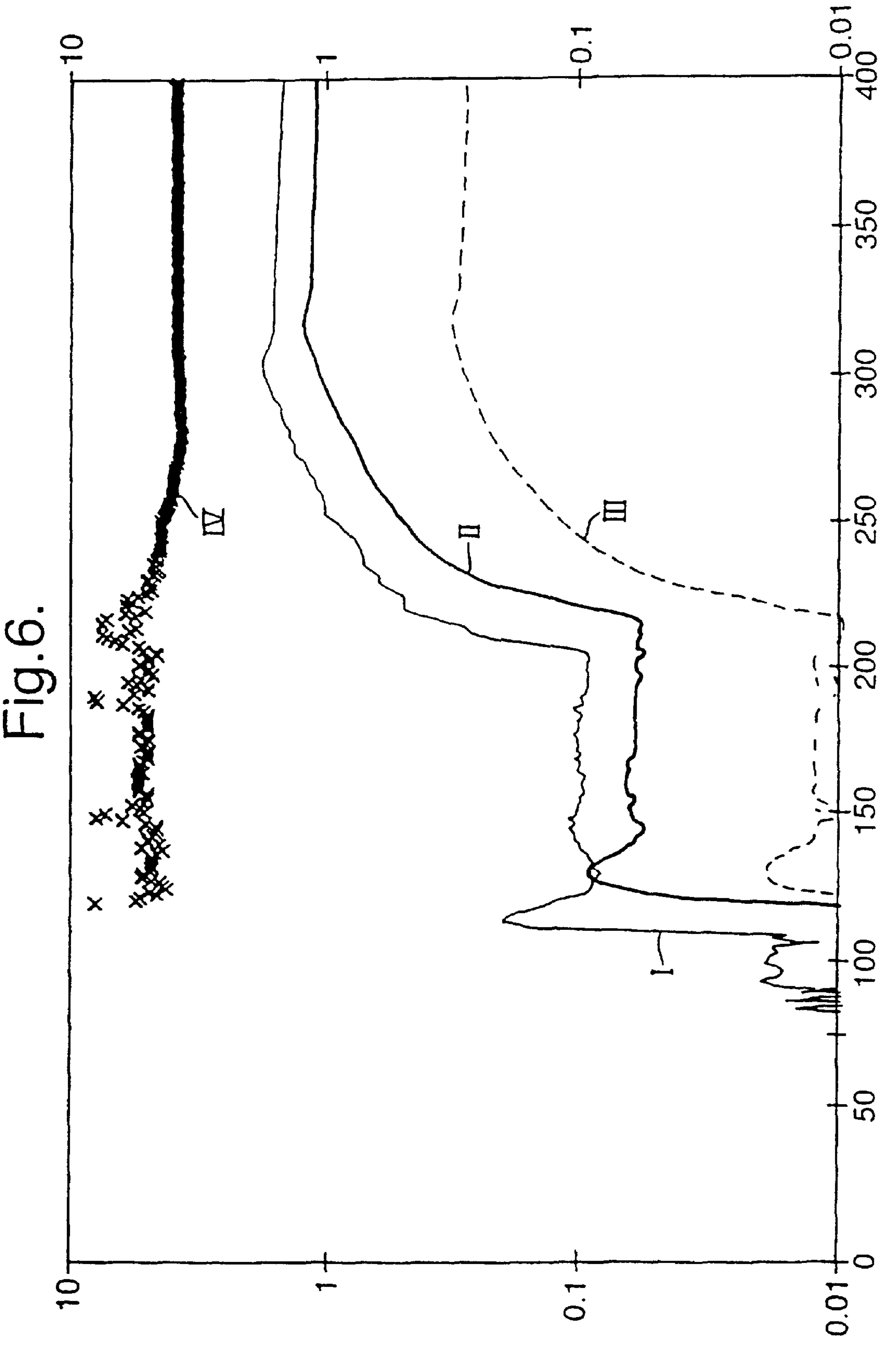
FIGS. 6 and 7 are graphs for explaining the operation of the apparatus embodying the invention shown in FIG. 5.
Figure 7:
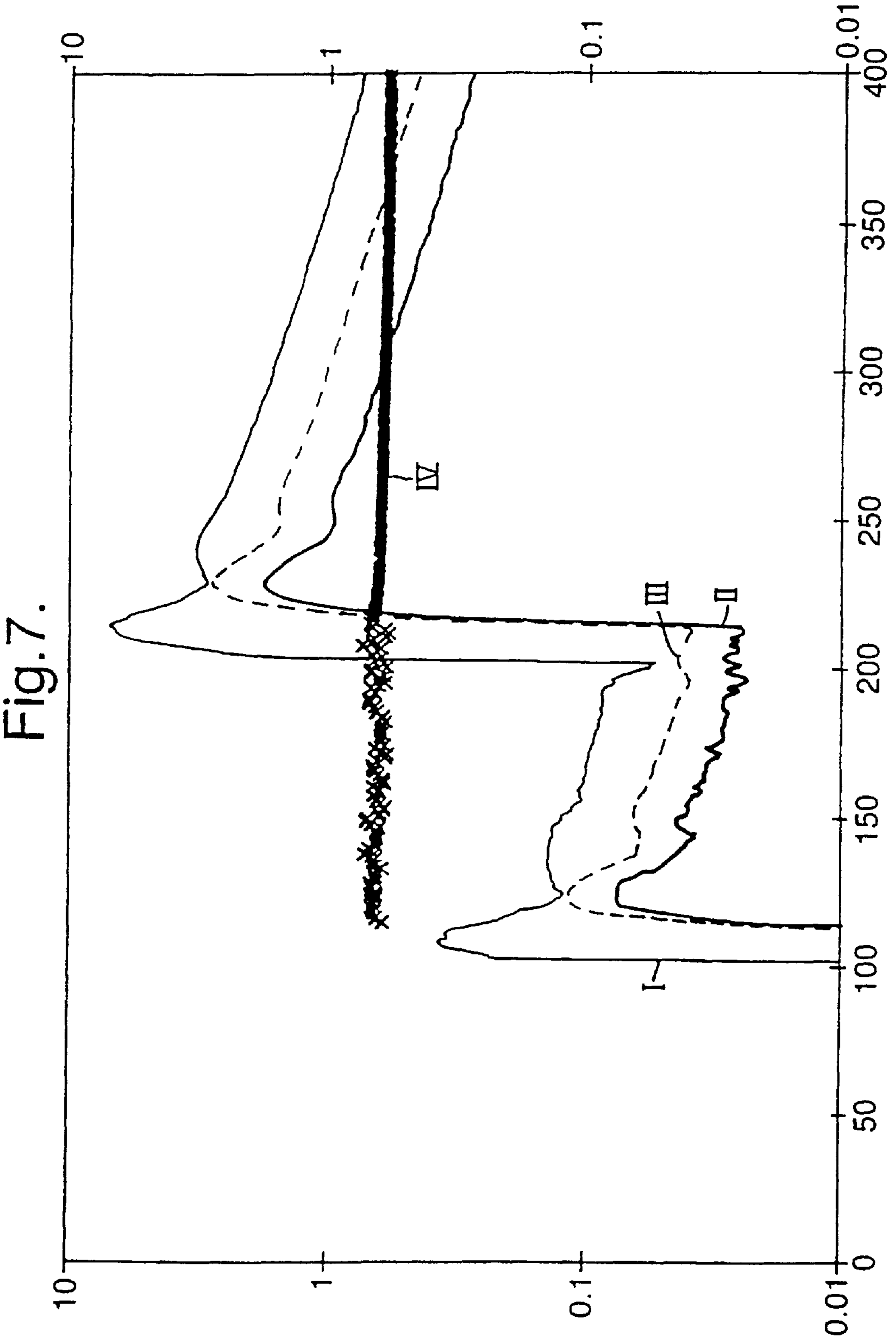

FIGS. 6 and 7 illustrate the operation of the arrangement of FIG. 5.

In FIGS. 6 and 7, the horizontal axis represents time, the left hand vertical axis represents visible obscuration expressed as a percentage of light obscured per meter, and the right hand vertical axis represents the output of the detector 15 in FIG. 5. The left and right hand axis are to a logarithmic scale.

FIG. 6 shows results obtained when obscuration is caused by smoke (in this case, grey smoke produced by smouldering cotton), the smoke being released for 5s at 100s and then for 100s between 200 and 300s. In FIG. 7, the obscuration is caused by a non-smoke source, in this case by a hairspray aerosol. A one second spray is released at 100s and a 10s spray at 200s.

In FIG. 6, curve I plots the obscuration. Curve II plots the output of the detector 15 in response to the blue light emitted by the source 3. Curve III plots the output of detector 15 in response to the infra-red radiation emitted by source 3A. It will be seen that the detector output in response to the scattered infra-red radiation (Curve III) is much less than the detector output in response to the scattered blue light (curve II). Curve IV shows the ratio of the detector output when the emitted radiation is blue light (curve II) to the output when the emitted radiation is infrared (curve III). The ratio is significantly greater than one.

In FIG. 7, the curves I,II,III and IV have the same identities as in FIG. 6. It will be noted that the ratio shown by curve IV is significantly less than one.

The unit 23 is therefore arranged to measure the ratio of the output of detector 15 to the output of detector 15A. If this ratio is more than one, obscuration by smoke is signalled. If the ratio is less than one, smoke obscuration is not signalled.

The infra-red radiation used in the embodiment of FIG. 5 does not need to be at 880 nm.

What is claimed is:

1. A particle detector for detecting particles of sizes of less than one micron, comprising radiation emitting means for emitting radiation at two different wavelengths along a predetermined path through a scattering volume, the radiation at one of the wavelengths lying between about 400 mm and about 500 mm, the radiation of the other wavelength being infra-red radiation, radiation detecting means for receiving and detecting the radiation scattered from the scattering volume by the presence of particles at a predetermined forward scattering angle of less than 45° to the predetermined path of radiation, and output means for comparing outputs from the detecting means respectively corresponding to the received and detected radiation between about 400 nm and 500 nm and the received and detected infra-red radiation whereby to produce a warning signal when the comparison indicates that the particles are of a predetermined type but not to produce said warning signal when the comparison indicates that the particles are not of said predetermined type, the radiation at the two different wavelengths being simultaneously emitted along the predetermined path.

2. A detector according to claim 1, in which the particles are smoke particles.

3. A detector according to claim 1, in which the detection means is a photodiode.

4. A detector according to claim 1, in which the output means measures the ratio between the two said outputs.

5. A detector according to claim 1, in which each radiation emitting means is an LED.

6. A detector according to claim 1 in which the predetermined scattering angle lies in a range between about 10° and 35°.

7. A detector according to claim 1, including collecting and focusing means for collecting the scattered radiation and focusing it on the detection means.

8. A detector according to claim 7, in which the collecting and focusing means is an ellipsoidal mirror.

9. A detector according to claim 1, including beam dump means positioned in the predetermined path and further from the radiation emitting means than the scattering volume.

10. A particle detecting method for detecting particles of sizes of less than one micron, comprising the steps of emitting radiation at two different wavelengths along a predetermined path through a scattering volume, one wavelength lying between about 400 nm and 500 nm and the radiation in the other wavelength being infra-red radiation, receiving and detecting the radiation scattered from the scattering volume by the presence of particles at a predetermined forward scattering angle of less than 45° to the predetermined path of radiation, and comparing the two outputs respectively corresponding to the received and detected radiation between 400 nm and about 500 nm and the received and detected infra-red radiation whereby to produce a warning signal when the comparison indicates that the particles are of a predetermined type but not to produce said warning signal when the comparison indicates that the particles are not of said predetermined type, the radiation at the two different wavelength bands being simultaneously emitted along the predetermined path.

11. A method according to claim 10, in which the particles are smoke particles.

12. A method according to claim 10, in which the comparison step comprises the step of measuring the ratio between the compared outputs.

13. A method according to claim 10, in which the predetermined scattering angle lies in a range between about 10° and 35°.

14. A method according to claim 10, including the step of collecting and focusing the scattered radiation.

* * * * *

UNITED STATES PATENT AND TRADEMARK OFFICE

CERTIFICATE OF CORRECTION

PATENT NO. : 6,377,345 B1
DATED : April 23, 2002
INVENTOR(S) : Brian Powell

It is certified that error appears in the above-identified patent and that said Letters Patent is hereby corrected as shown below:

Column 5,
Line 5, change "mm" to read -- nm --
Line 6, change "mm" to read -- nm --

Signed and Sealed this

Eighteenth Day of June, 2002

*Attest:*

JAMES E. ROGAN

*Attesting Officer* *Director of the United States Patent and Trademark Office*